United States Patent
Dombroski

(10) Patent No.: US 7,108,336 B2
(45) Date of Patent: Sep. 19, 2006

(54) EMERGENCY AXLE

(75) Inventor: Henry Dombroski, Boynton Beach, FL (US)

(73) Assignee: Air Tight, Jupiter, FL (US)

( * ) Notice: Subject to any disclaimer, the term of this patent is extended or adjusted under 35 U.S.C. 154(b) by 0 days.

(21) Appl. No.: 10/969,766

(22) Filed: Oct. 19, 2004

(65) Prior Publication Data

US 2006/0082215 A1    Apr. 20, 2006

(51) Int. Cl.
B60B 35/00 (2006.01)

(52) U.S. Cl. ............... 301/130; 301/132; 301/124.1; 301/111.03; 29/402.13

(58) Field of Classification Search ............ 301/130, 301/131, 132, 124.1, 137, 128, 111, 111.03; 29/402.13, 402.06, 402.7, 402.08, 402.09, 29/402.14
See application file for complete search history.

(56) References Cited

U.S. PATENT DOCUMENTS

| | | | | |
|---|---|---|---|---|
| 1,410,863 A | * | 3/1922 | Woodson | ............ 301/130 |
| 1,480,223 A | * | 1/1924 | Robechaud | ............ 301/130 |
| 1,480,462 A | * | 1/1924 | Owen | ............ 301/130 |
| 2,900,053 A | * | 8/1959 | Lowery et al. | ......... 188/106 R |
| 3,000,673 A | * | 9/1961 | Lansing | ............ 301/128 |
| 3,064,982 A | | 11/1962 | Stephens | |
| 3,879,058 A | | 4/1975 | Hom | |
| 4,776,640 A | * | 10/1988 | Rezza | ............ 301/38.1 |
| 5,401,080 A | * | 3/1995 | Wenzel | ............ 301/132 |
| 5,560,629 A | | 10/1996 | Allard et al. | |
| 5,813,687 A | | 9/1998 | Lay et al. | |
| 6,024,418 A | * | 2/2000 | Ebert | ............ 301/130 |
| 6,164,679 A | | 12/2000 | Lay | |

\* cited by examiner

Primary Examiner—Frantz F. Jules
(74) Attorney, Agent, or Firm—McHale & Slavin PA

(57) ABSTRACT

An emergency axle is provided for small trailers normally pulled by automobiles or small trucks. The emergency axle may be carried on the trailer on in the pulling vehicle. In the event an axle is damaged or breaks, the emergency axle is placed over the end of that axle so that the wheel is remounted and the trip continues. The emergency axle has an extension tube for sliding over the end of the damaged axle. One end of the tube is closed with an attachment plate which connects to the brake mounting plate on the trailer axle. The other end of the tube is closed by an axle plate with a stub axle to which the wheel can be mounted.

11 Claims, 4 Drawing Sheets

EMERGENCY AXLE

BACKGROUND OF THE INVENTION

1. Field of the Invention

This invention relates to an emergency repair of a disabled trailer by replacement of a broken or damaged trailer axle.

2. Description of the Prior Art

Trailers used to haul furniture, horses, boats, snowmobiles, personal watercraft, ATV's, gliders, etc., are usually attached to an automobile or small truck by a simple ball hitch. The trailers can have a ladder frame with side rails extending along the length connected to spaced cross members. The frame includes one or more axles terminating in hub assemblies on each side of the trailer. Tires mounted on wheels bolted to the hub assemblies support the frame and provide locomotion for the trailer.

The axles and hub assemblies of such small trailers are subjected to extremes of operating conditions, including submersion in water or mud, high speeds and general lack of maintenance. Because of these factors, it is not uncommon to observe such trailers abandoned along the highways as a result of the failure of an axle or wheel assembly. This invites criminality of misappropriation and possible violence, not to mention the inconvenience and expense of delay.

Others have addressed this problem in various ways, for example, U.S. Pat. No. 3,879,058 to Horn teaches the use of a spare wheel assembly that can be swung into position to replace a damaged wheel. Lay, U.S. Pat. No. 6,164,679 teaches the use of an auxiliary wheel chained into place. Lay et al, U.S. Pat. No. 5,813,687 teach a spare wheel attached to the trailer frame until needed. U.S. Pat. No. 5,560,629 teaches a vertical strut mounting a wheel and tire assembly to replace a broken axle. All of these references use an entire wheel, hub and tire assembly as a replacement. These devices are both heavy and bulky which adds to the over-all weight of the trailer and requires a greater size to carry them.

SUMMARY OF THE PRESENT INVENTION

Therefore, it is an object of this invention to provide an emergency axle that is small and lightweight.

It is another object of this invention to provide an emergency axle onto which the existing hub and wheel assembly can be mounted.

It is a further object of this invention to provide an emergency axle that can be attached to the existing brake mounting plate of a trailer.

It is a still further object of this invention to provide an emergency axle with an adapter plate allowing connection to a variety of brake amounting plates.

SHORT DESCRIPTION OF THE DRAWINGS

DETAILED DESCRIPTION OF THE INVENTION

Figure 1:
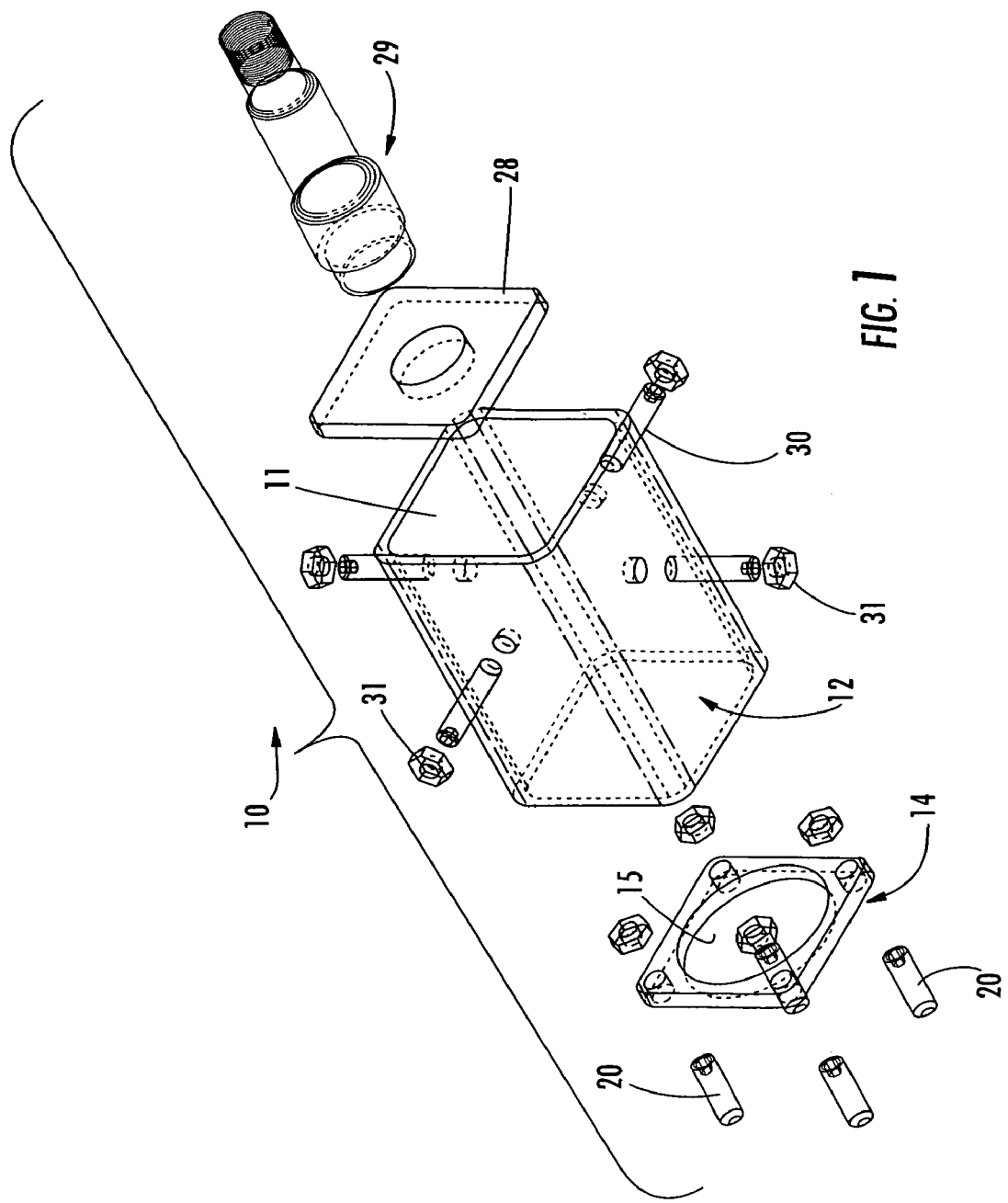
FIG. 1 is an exploded perspective of the emergency axle of this invention.
Figure 2:
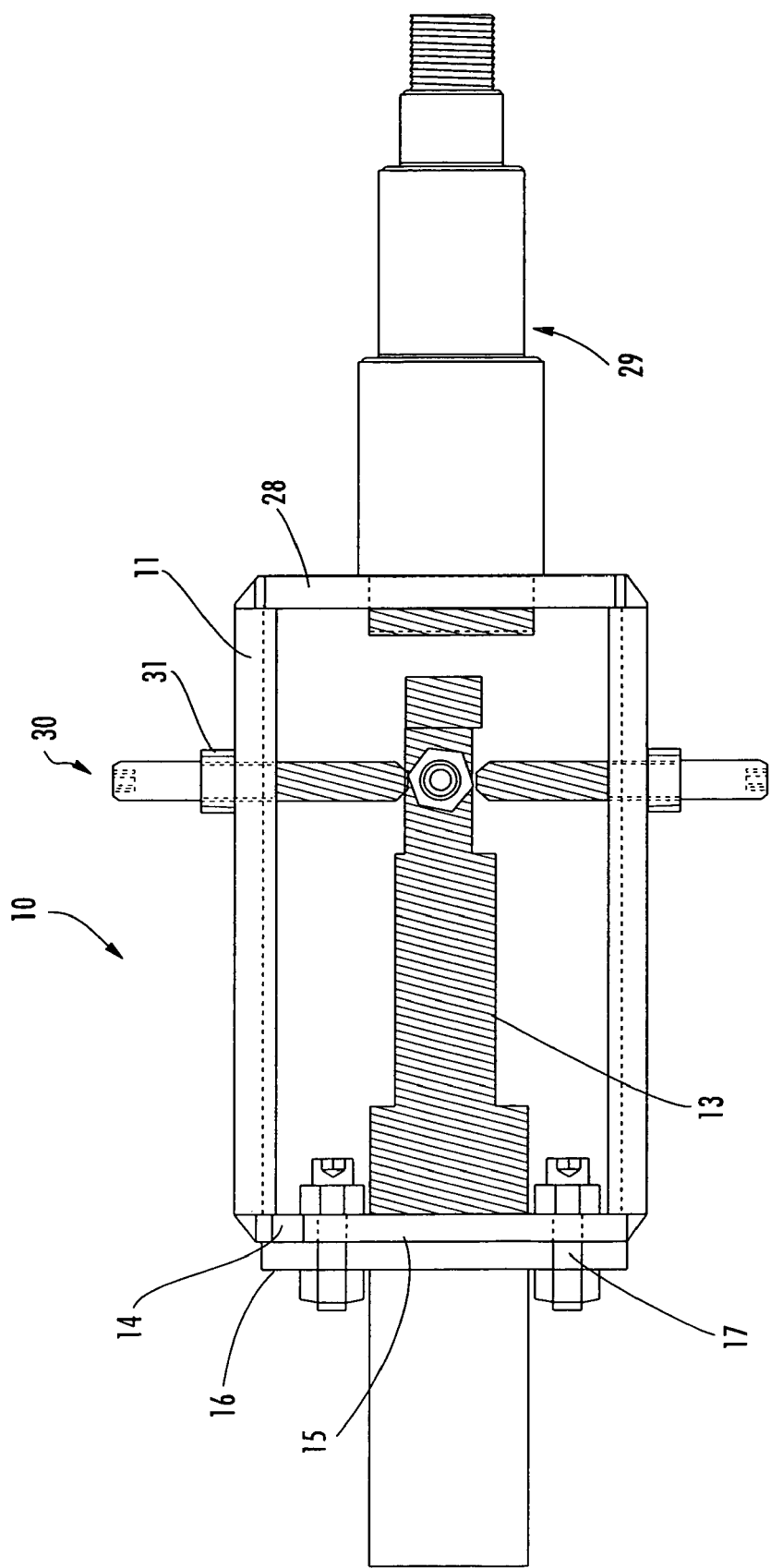
FIG. 2 is a cross section of the invention shown in FIG. 1.

The emergency axle 10 is carried on a small trailer usually towed by an automobile or small truck (not shown). The storage position may be along one of the side rails of the trailer or it may be carried separately in the towing vehicle. The emergency axle is small enough and light enough to be manually lifted and placed in the operative position.

Usually, the axle of a small trailer fails because of inadequate lubrication around the wheel bearings although there can be other reasons for the failure. The excess heat generated between the wheel and axle weaken the structure of the axle and lead to distortion or complete separation of the axle. The wheel becomes severely out of alignment or collapses. At this point, further travel is unsafe or impossible without repairs.

A vehicle jack can be used to raise the frame or axle to a normal position with the wheel above ground level. The wheel and hub assembly can then be removed from the damaged end of the trailer axle. The wheel and hub assembly may be used with the emergency axle, if desired. Obviously, if an additional wheel and hub assembly are carried with the cargo, it may be used with the emergency axle 10.

Once the original wheel and hub assembly are off the damaged or broken axle, the emergency axle 10 may be telescoped over the end of the trailer axle. The extension tube 11 is a hollow enclosure with an interior 12 that is large enough to accept the damaged end of the trailer axle 13. As shown, the extension tube 11 is rectilinear but may be of different cross sections. One end of the extension tube is closed with an attachment plate 14. The attachment plate may be welded in place or otherwise formed to be integral with the extension tube. An aperture 15 is formed in the center of the attachment plate and is of a size to allow the passage of the damaged end of the axle 13.

In light trailers, the axles have a brake mounting plate 16 near each end. Conventionally, the brake mounting plates are approximately 4 inches on a side for weights from about 1000 pounds to about 3500 pounds and 5 inches on a side from about 5000 pounds to about 8000 pounds. The 4 inch mounting plates have a bore near each corner. The 5 inch plates have five bores between the central aperture 15 and the periphery of the plate.

Figure 3:
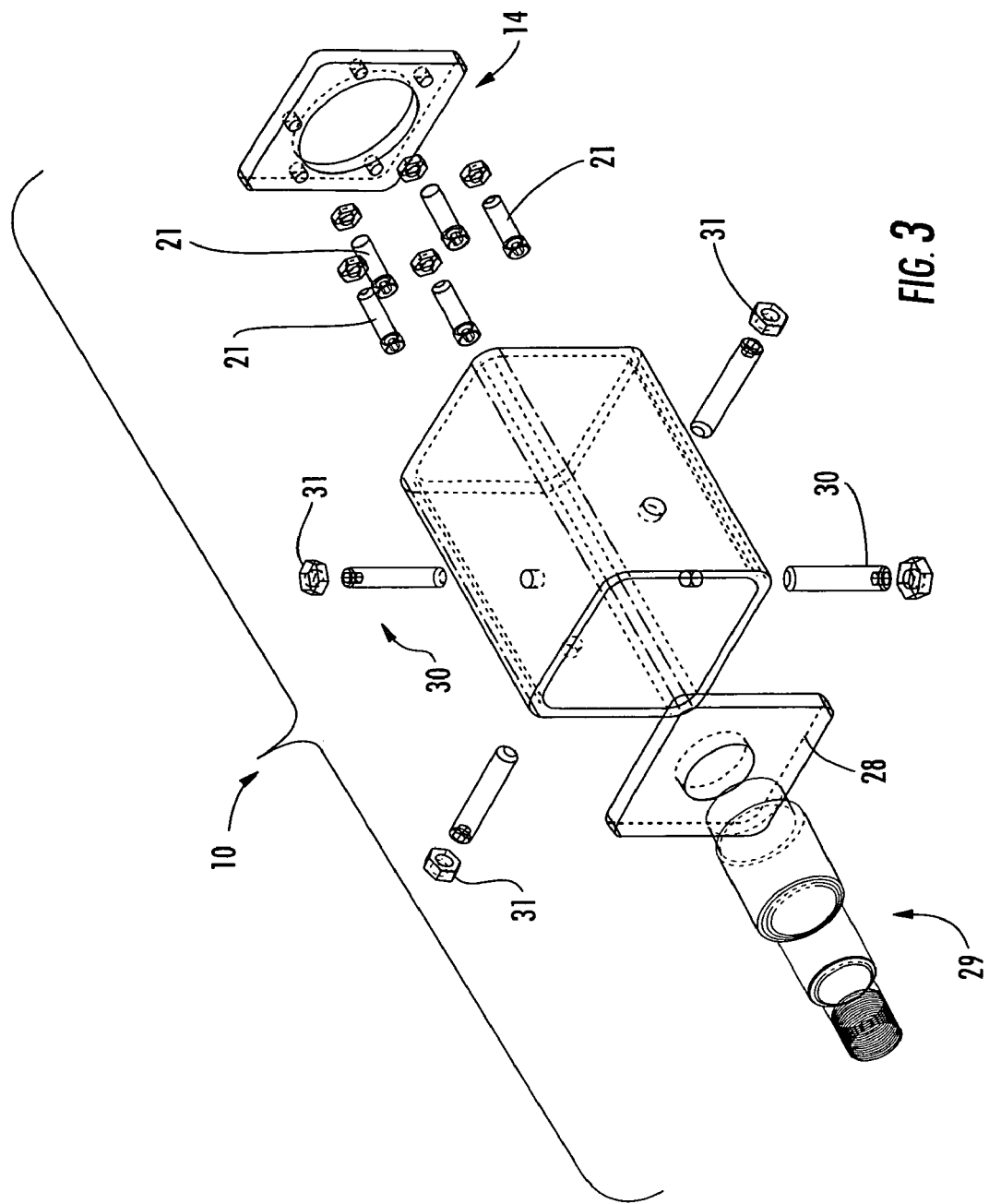
FIG. 3 is an exploded perspective of the emergency axle of this invention shown in FIG. 1 with a modified attachment plate.

The emergency axle may be made in two models with either four studs 20 on the attachment plate 14 or five studs 21 on the plate to accommodate the different sized trailer brake mounting plate. In the alternative, an adapter plate 22, shown in FIGS. 4–5, may be used. As shown, the adapter plate is made to reduce a five stud attachment plate, as shown in FIG. 3, to a four stud attachment plate, as shown in FIG. 1. In this case an emergency axle with five studs 21 could be fitted to a brake mounting plate with four bores. Clearly, an adapter plate can be made in the reverse to increase a four stud emergency axle to fit a brake mounting plate with five holes.

Figure 5:
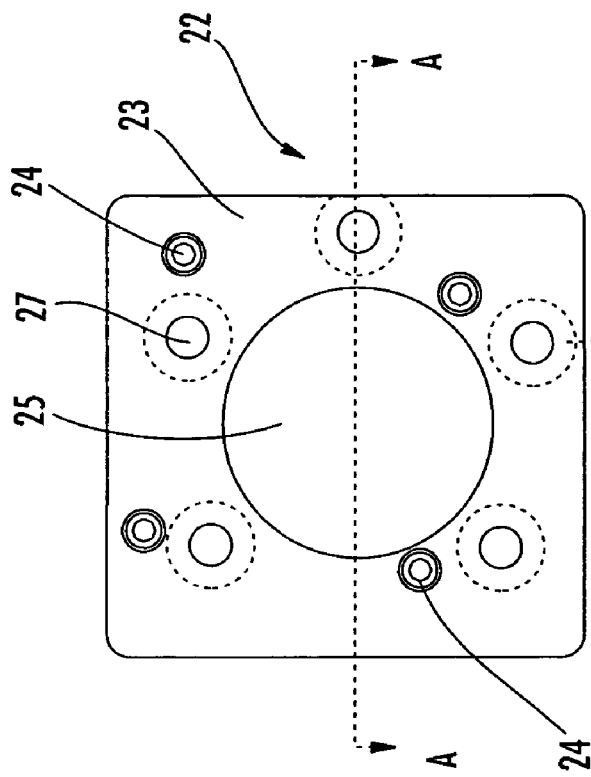
FIG. 5 is a front view of the adapter plate of FIG. 4.
Figure 4:
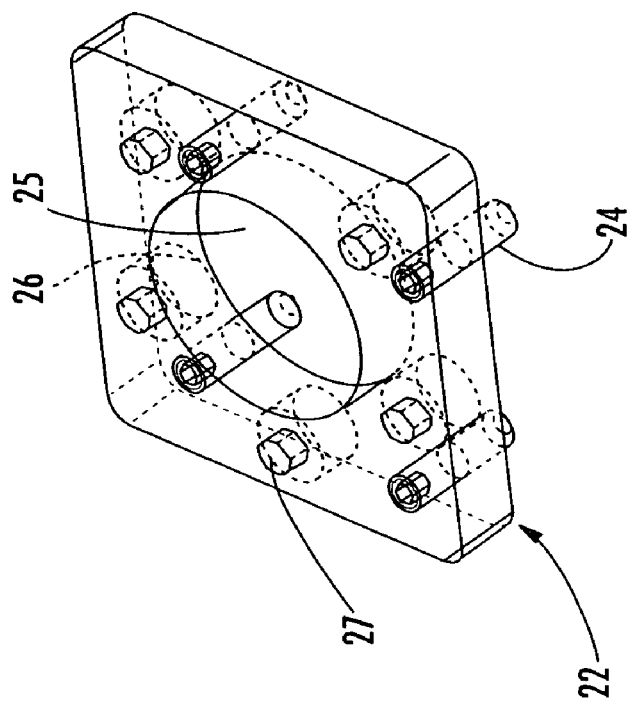
FIG. 4 is a perspective of an adapter plate of this invention.

The adapter plate 22 has a brake side for contacting the brake mounting plate. The other side of the adapter plate 22 is the axle side for contacting the emergency axle attachment plate. In FIGS. 4–5, the brake side 23 has four studs 24 permanently attached and extending outwardly therefrom at points about the central aperture 25 that will register with the four bores 17 in a 4 inch brake mounting plate. Also on the brake side 23 and around the central aperture is a set of counter sunk bores 26 extending through the adapter plate. These counter sunk bores 26 are connected with standard bores 27 extending from the counter sunk bores through the adapter plate and terminating on the axle side of the adapter plate. In this manner, the adapter plate may be fitted on a five stud attachment plate 18 and mounted on a four bore brake mounting plate.

The other end of the extension tube is closed with an axle plate 28. The axle plate 28 is integrally connected to the extension tube by welding or other permanent attachment methods. The axle plate 28 and the stub axle 29 may be a unitary assembly or separate components permanently connected together. The stub axle 29 is of a shape and size to accommodate the hub and wheel assembly of the trailer.

The extension tube 11 has a series of set screws 30 spaced circumferentially around the tube equidistant from the ends. The set screws are heavy duty threaded bolts mated to screw threads in the set screw holes. The set screws are tightened to contact the circumference of the damaged axle to support the emergency axle. Each set screw has a jam nut 31 threaded on the shaft. The jam nuts are then tightened until they are in contact with the exterior of the extension tube. This locks the set screws in position to support the extension tube in spaced relation to the damaged axle.

The original wheel and hub assembly may be mounted on the stub axle and the wheel lowered to the ground before or after the set screws have been adjusted. The track of the wheel will be displaced from the original track approximately 6 inches due to the dimensions of the emergency axle.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

I claim:

1. In a trailer having a frame supported by at least one axle, said at least one axle having a first end and a second end, a first brake mounting plate near said first end and a second brake mounting plate near said second end, each said brake mounting plates having a plurality of bolt holes therethrough, the improvement comprising an emergency axle carried on said frame and adapted to repair said at least one axle, said emergency axle having an extension tube adapted to telescope over an end of said at least one axle in need of repair, said extension tube having an attachment plate closing one end, an aperture in said attachment plate of a size and shape to accommodate said end of said at least one axle in need of repair, said attachment plate adapted to be removably attached to said brake mounting plate on said end of said at least one axle in need of repair, said extension tube having an axle plate integrally closing the other end, said axle plate including a stub axle extending from said axle plate whereby said emergency axle may be removed from said frame and telescoped over said damaged end of said at least one axle in need of repair and connected to said brake mounting plate near said damaged end for temporary repair of said at least one axle, said attachment plate has a plurality of studs about said aperture, said emergency axle includes an adapter plate with an attachment plate side and a brake side, said attachment plate side includes a first set of bores therethrough oriented to register with the plurality of studs extending from said attachment plate and a second set of studs on said brake side adapted to register with a different plurality of bolt holes on said brake mounting plate.

2. An axle extension for connection to a brake mounting plate on a non-rotating trailer axle for repairing a damaged axle, said brake mounting plate having a set of bolt holes, said axle extension comprising an extension tube having a first end and a second end, an integral attachment plate closing said first end, said attachment plate having an aperture of a size larger than the end of the damaged axle, said attachment plate including a plurality of studs through said plate, said studs adapted to register with the bolt holes in the brake mounting plate to temporarily secure said first end of said extension tube to the brake mounting plate, an axle plate closing said second end of said extension tube, said axle plate having a permanently connected stub axle extending away from said extension tube and adapted to mount a wheel hub thereon.

3. An axle extension of claim 2 wherein said attachment plate includes a plurality of studs about said aperture, said plurality of studs oriented to register with said plurality of bolt holes in said brake mounting plate whereby said extension tube is adapted to be connected to said brake mounting plate.

4. An axle extension of claim 3 wherein said extension tube includes a plurality of set screws spaced circumferentially about said tube, said set screws adapted to adjustably engage said damaged of said at least one axle and support said extension tube in spaced relation to said damaged end of said at least one axle.

5. An axle extension of claim 2 wherein said extension tube includes a plurality of set screws spaced circumferentially about said tube, said set screws adapted to adjustably engage said damaged end of said at least one axle and support said extension tube in spaced relation to said damaged end of said at least one axle.

6. An axle extension of claim 5 wherein said attachment plate has a first plurality of studs about said aperture, said emergency axle includes an adapter plate with an attachment plate side and a brake side, said attachment plate side includes a first set of bores therethrough oriented to register with the plurality of studs on said brake side adapted to register with a different plurality of bolt holes on said brake mounting plate.

7. An axle extension of claim 2 wherein said extension tube includes a plurality of set screws spaced circumferentially about said tube, said set screws adapted to adjustably engage said damaged end of said at least one axle and support said extension tube in spaced relation to said damaged end of said at least one axle.

8. An axle extension of claim 7 wherein said attachment plate has a first plurality of studs about said aperture, said emergency axle includes an adapter plate with an attachment plate side and a brake side, said attachment plate side includes a first set of bores therethrough oriented to register with a plurality of studs extending from said attachment plate and a second set of studs on said brake side adapted to register with a different plurality of bolt holes on said brake mounting plate.

9. An axle extension for connection to a brake mounting plate on a trailer axle for repairing a damaged axle, said brake mounting plate having a set of bolt holes, said axle extension comprising an extension tube having a first end and a second end, an attachment plate closing said first end, said attachment plate having an aperture of a size larger than the end of the damaged axle, said attachment plate including a plurality of studs through said plate, said studs adapted to register with the bolt holes in the brake mounting plate to temporarily secure said extension tube to the brake mounting plate, an axle plate closing said second end of said extension tube, said axle having a stub axle extending away from said extension tube and adapted to mount a wheel hub thereon, said attachment plate has a first plurality of studs about said aperture, said axle extension includes an adapter plate with an attachment plate side and a brake side, said attachment plate side includes a first set of bores therethrough oriented to register with a plurality of studs extending from said attachment plate and a second set of studs on said brake side adapted to register with a different plurality of bolt holes on said brake mounting plate.

10. In a method of emergency repair of a damaged trailer axle, including a brake mounting plate, an emergency axle assembly comprising an extension tube having an attachment plate closing one end, said attachment plate having an aperture for telescoping over an end of a non-rotating axle and a plurality of studs about said aperture, an axle plate closing the other end of said extension tube and carrying a stub axle, including the steps of:
 a) raising said damaged axle to provide ground clearance for the wheel
 on said damaged axle;
 b) removing said wheel and hub assembly from said damaged axle;
 c) removing said emergency axle from a storage position;
 d) sliding said extension tube over the end of said damaged axle and guiding said studs through holes in said brake mounting plate;
 e) securing said studs to said brake mounting plate;
 f) mounting said wheel and said hub assembly on said stub axle; and
 g) lowering said stub axle and wheel to support said trailer.

11. In a method of emergency repair of claim 10 wherein said extension tube has a plurality of set screws positioned about the circumference of said tube, including the steps of:
 a) tightening said plurality of set screws to engage said damaged axle within said extension tube; and
 b) locking said set screws in position with lock nuts;
 whereby said extension tube is spaced from said damaged axle.

* * * * *